US008482748B2

(12) United States Patent
Hara

(10) Patent No.: US 8,482,748 B2
(45) Date of Patent: Jul. 9, 2013

(54) APPARATUS AND NON-TRANSITORY COMPUTER READABLE MEDIUM FOR SUCCESSIVE IMAGE PROCESSING

(75) Inventor: Yuki Hara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/476,315

(22) Filed: May 21, 2012

(65) Prior Publication Data
US 2012/0300238 A1 Nov. 29, 2012

(30) Foreign Application Priority Data

May 26, 2011 (JP) ................................. 2011-117935

(51) Int. Cl.
G06F 3/12 (2006.01)
(52) U.S. Cl.
USPC ....................................... 358/1.13
(58) Field of Classification Search
None
See application file for complete search history.

(56) References Cited

U.S. PATENT DOCUMENTS

2003/0025927 A1* 2/2003 Hino et al. ................... 358/1.13
2004/0196496 A1* 10/2004 Klassen ....................... 358/1.15

FOREIGN PATENT DOCUMENTS

JP A-06-076050 3/1994

* cited by examiner

Primary Examiner — Jeremiah Bryar
(74) Attorney, Agent, or Firm — Oliff & Berridge, PLC

(57) ABSTRACT

An image processing apparatus including an image processing unit, a memory, a setting information writing unit, a printing information writing unit, an image information reading unit, and an instruction unit. The image processing unit dynamically changes a configuration thereof, and performs image processing in accordance with the changed configuration. The memory stores setting information for setting a change of the configuration of the image processing unit, printing information used for image processing to be performed by the image processing unit, and image information generated through image processing performed by the image processing unit. The setting information writing unit writes the setting information to the memory. The printing information writing unit writes the printing information to the memory. The image information reading unit reads the image information from the memory. The instruction unit instructs the image processing unit to start execution of image processing.

6 Claims, 9 Drawing Sheets

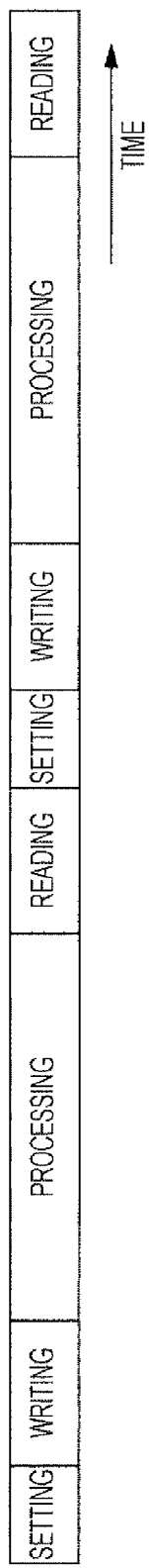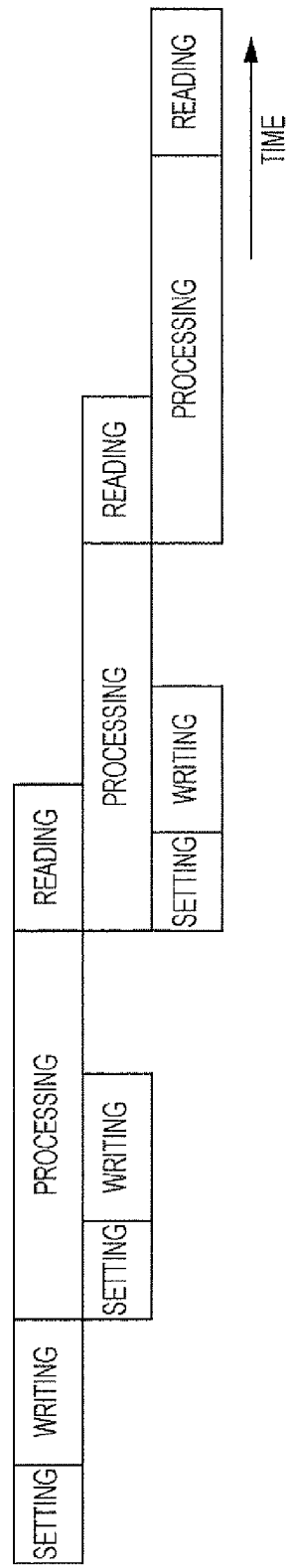
FIG. 5A
FIG. 5B

APPARATUS AND NON-TRANSITORY COMPUTER READABLE MEDIUM FOR SUCCESSIVE IMAGE PROCESSING

CROSS-REFERENCE TO RELATED APPLICATIONS

This application is based on and claims priority under 35 USC 119 from Japanese Patent Application No. 2011-117935 filed May 26, 2011.

BACKGROUND (i) Technical Field

The present invention relates to an image processing apparatus and a non-transitory computer readable medium.

(ii) Related Art

Information processing apparatuses such as computers may be provided with external add-on devices that perform information processing using hardware, and information processing may be performed by such external devices to speed up information processing.

In addition, when information processing is performed by an external device, concurrent writing and reading of data to and from a memory of the external device allows efficient use of the external device. In this case, data may be written to and read from the same memory or the like.

SUMMARY

According to an aspect of the invention, there is provided an image processing apparatus including an image processing unit, a memory, a setting information writing unit, a printing information writing unit, an image information reading unit, and an instruction unit. The image processing unit dynamically changes a configuration thereof, and performs image processing in accordance with the changed configuration. The memory stores setting information for setting a change of the configuration of the image processing unit, printing information used for image processing to be performed by the image processing unit, and image information generated through image processing performed by the image processing unit. The setting information writing unit writes the setting information to the memory. The printing information writing unit writes the printing information to the memory. The image information reading unit reads the image information from the memory. The instruction unit instructs the image processing unit to start execution of image processing. In a case where the image processing unit is caused to successively execute first image processing and second image processing, the setting information writing unit writes setting information corresponding to the second image processing and the printing information writing unit writes printing information to be used for the second image processing while the image processing unit is executing the first image processing. Further, the instruction unit instructs that execution of the second image processing be started when the image processing unit completes the first image processing. Further, the image information reading unit reads image information corresponding to the first image processing while the image processing unit is executing the second image processing.

BRIEF DESCRIPTION OF THE DRAWINGS

Exemplary embodiments of the present invention will be described in detail based on the following figures, wherein:

FIGS. 5A and 5B illustrate the operation of the DRP when the DRP is caused to successively execute processing;

DETAILED DESCRIPTION

An image processing apparatus and an image processing control program according to an exemplary embodiment of the present invention will be described in detail hereinafter with reference to the accompanying drawings.

First Exemplary Embodiment

Figure 1:
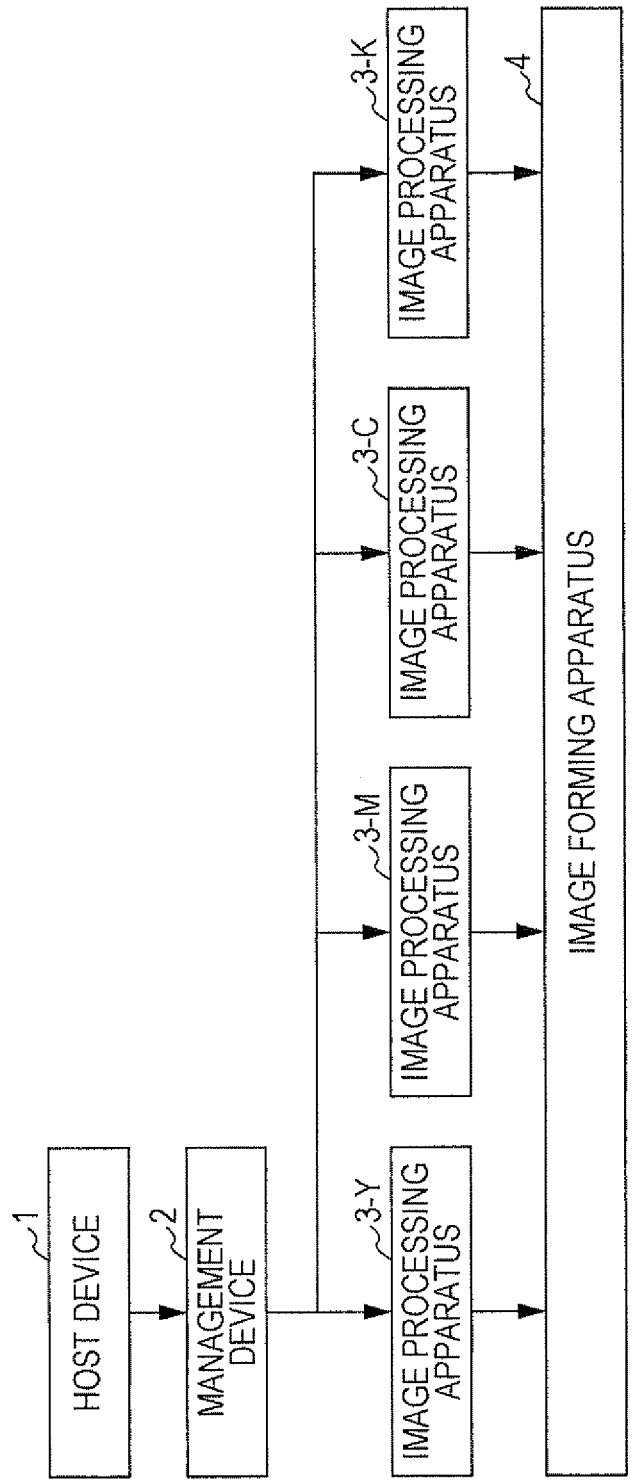
FIG. 1 is a block diagram illustrating an example configuration of an image forming system.

FIG. 1 is a block diagram illustrating an example configuration of an image forming system. The image forming system illustrated in FIG. 1 includes a host device 1, a management device 2, an image processing apparatus 3-Y, an image processing apparatus 3-M, an image processing apparatus 3-C, an image processing apparatus 3-K, and an image forming apparatus 4.

The host device 1 outputs printing information necessary to form an image.

The management device 2 separates the printing information into pieces about yellow (Y), magenta (M), cyan (C), and black (K), and outputs the yellow printing information, the magenta printing information, the cyan printing information, and the black printing information to the image processing apparatus 3-Y, the image processing apparatus 3-M, the image processing apparatus 3-C, and the image processing apparatus 3-K, respectively. The management device 2 further performs management and the like of the operations of the image processing apparatus 3-Y, the image processing apparatus 3-M, the image processing apparatus 3-C, and the image processing apparatus 3-K.

Each of the image processing apparatus 3-Y, the image processing apparatus 3-M, the image processing apparatus 3-C, and the image processing apparatus 3-K performs processing such as converting the printing information into image information, creating page information on the basis of the image information, and controlling an operation of the image forming apparatus 4 which is associated with the corresponding color.

The image forming apparatus 4 forms an image on a sheet of paper in accordance with the pieces of page information input from the image processing apparatus 3-Y, the image processing apparatus 3-M, the image processing apparatus 3-C, and the image processing apparatus 3-K.

Next, a description will be made of the image processing apparatus 3-Y, the image processing apparatus 3-M, the image processing apparatus 3-C, and the image processing apparatus 3-K. Since the image processing apparatus 3-Y, the image processing apparatus 3-M, the image processing apparatus 3-C, and the image processing apparatus 3-K have equivalent configurations and functions, one of them will be described as a typical example. The image processing apparatus described hereinafter may also be used in another image forming system such as an image forming system in which image processing for all colors is performed by a single image processing apparatus.

Figure 2:
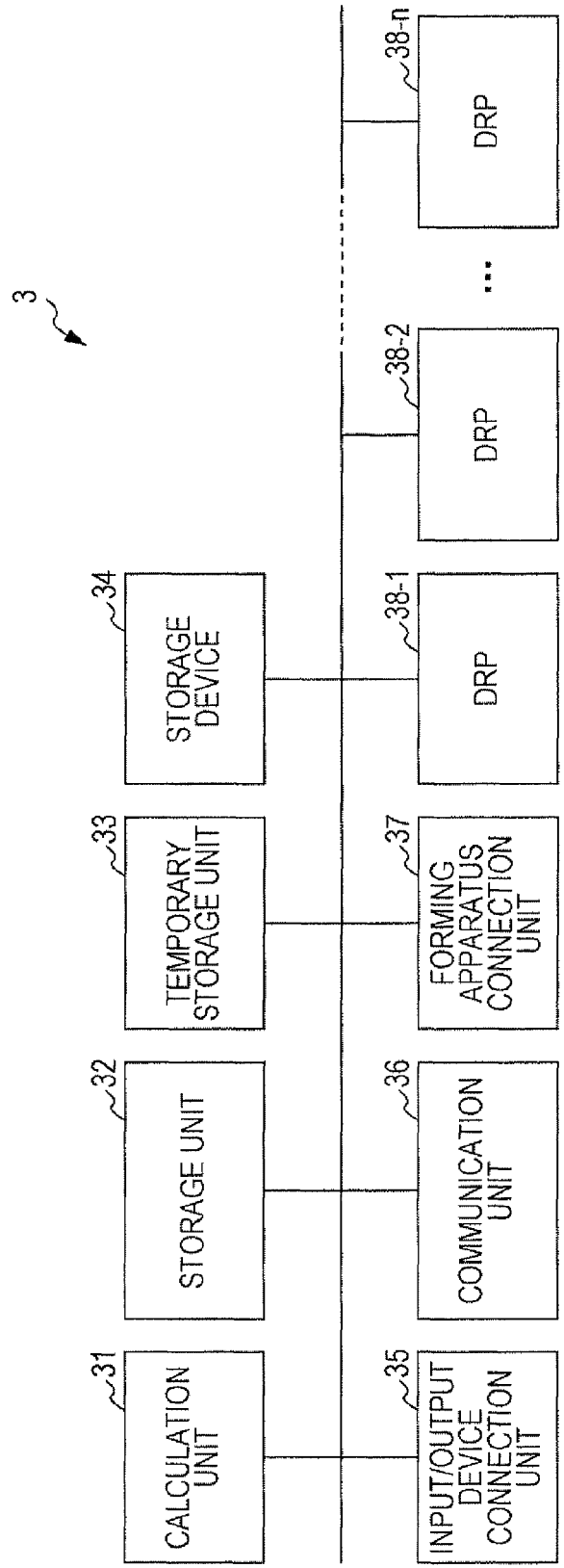
FIG. 2 illustrates an example configuration of an image processing apparatus.

FIG. 2 illustrates an example configuration of an image processing apparatus 3. The image processing apparatus 3 illustrated in FIG. 2 corresponds to the image processing apparatus 3-Y, the image processing apparatus 3-M, the image processing apparatus 3-C, and the image processing apparatus 3-K.

As illustrated in FIG. 2, the image processing apparatus 3 includes a calculation unit 31, a storage unit 32, a temporary storage unit 33, a storage device 34, an input/output device connection unit 35, a communication unit 36, a forming apparatus connection unit 37, and plural dynamically reconfigurable processors (DRPs) 38 (38-1 to 38-n).

The calculation unit 31 performs calculation processing, and may be implemented by a processor such as a central processing unit (CPU).

The storage unit 32 stores programs, setting information, etc., and may be implemented by a semiconductor storage element such as a read only memory (ROM) or a nonvolatile memory.

The temporary storage unit 33 may be used as a work area or the like when the calculation unit 31 performs calculation processing, for temporarily storing information etc., and may be implemented by a semiconductor storage element such as a random access memory (RAM).

The storage device 34 stores programs, setting information, printing information, image information, etc., and may be implemented by a magnetic disk or a semiconductor storage element.

The input/output device connection unit 35 is an interface to which user interface devices including a monitor device and an input device such as a keyboard and a pointing device are connected, and may be implemented by an integrated circuit, a connector, or any other suitable device.

The communication unit 36 is an interface used for communication when the image processing apparatus 3 sends and receives information etc. to and from the management device 2, and may be implemented by an integrated circuit, a connector, or any other suitable device.

The forming apparatus connection unit 37 is an interface used for communication when the image processing apparatus 3 exchanges information etc. with the image forming apparatus 4, and may be implemented by an integrated circuit, a connector, or any other suitable device.

The DRPs 38-1 to 38-n are processors configured to perform image processing, and are specifically dynamically reconfigurable. The DRPs 38 are configured to make internal data paths dynamically changeable to perform various kinds of image processing.

Figure 3:
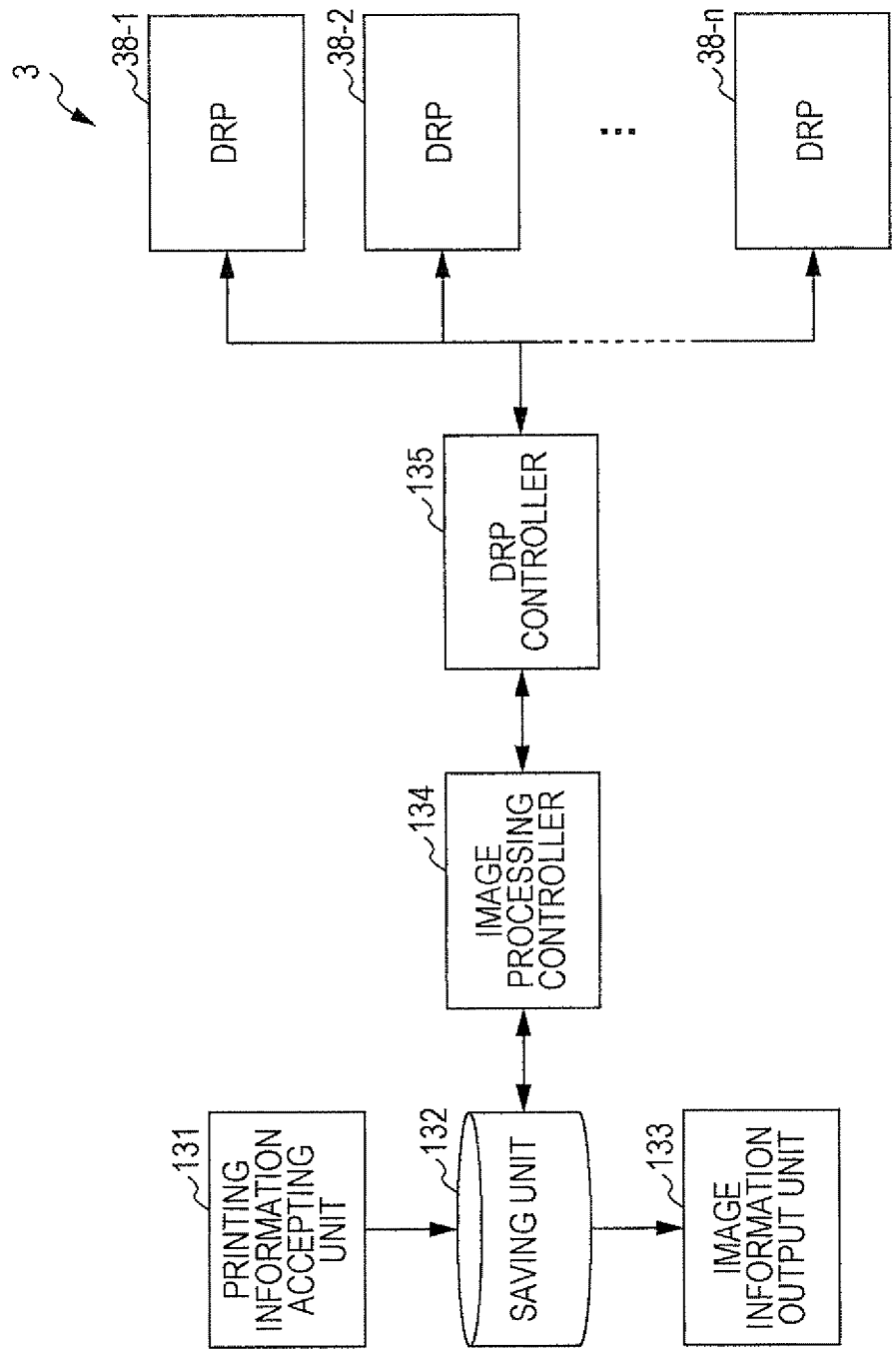
FIG. 3 is a block diagram illustrating an example functional configuration of the image processing apparatus.

Subsequently, a functional configuration of the image processing apparatus 3 will be described. FIG. 3 is a block diagram illustrating an example functional configuration of the image processing apparatus 3.

As illustrated in FIG. 3, the image processing apparatus 3 includes the respective functions of a printing information accepting unit 131, a saving unit 132, an image information output unit 133, an image processing controller 134, and a DRP controller 135.

The above functional units may be implemented by causing the calculation unit 31 and the like to operate in accordance with a program stored in the storage device 34. Further, the functional units implement the storage device 34, the communication unit 36, the forming apparatus connection unit 37, etc., if necessary. The program stored in the storage device 34 may be provided through an optical storage medium such as a compact disk read only memory (CD-ROM) or any other medium, and may also be provided over a network.

The printing information accepting unit 131 receives and accepts printing information transmitted from the management device 2. The printing information is received using the communication unit 36.

The saving unit 132 saves the printing information accepted by the printing information accepting unit 131, and image information and the like generated by the DRPs 38 on the basis of the printing information. The above information is stored using the storage device 34.

The image information output unit 133 outputs the image information generated by the DRPs 38 and saved in the saving unit 132, in accordance with the operation of the image forming apparatus 4. The image information is output using the forming apparatus connection unit 37.

The image processing controller 134 performs processing such as distributing printing information for causing each of the plural DRPs 38 to execute image processing. Further, the image processing controller 134 outputs the image information generated by each of the DRPs 38 to the saving unit 132.

The DRP controller 135 controls each of the plural DRPs 38. Specifically, the DRP controller 135 sends to each of the DRPs 38 an instruction for performing setting in accordance with the content of the image processing to be performed by the DRP 38, writes to each of the DRPs 38 printing information on which image processing is to be performed, reads from each of the DRPs 38 the image information generated through image processing, and performs any other necessary operation.

Here, information transmitted from the host device 1 via the management device 2 is described as printing information and information to be output to the image forming apparatus 4 is described as image information. More specifically, printing information is information to be input to the DRPs 38, and image information is information output from the DRPs 38. This implies that, depending on the content of image processing, image information output from the DRPs 38 may also be used as printing information.

Figure 4A:
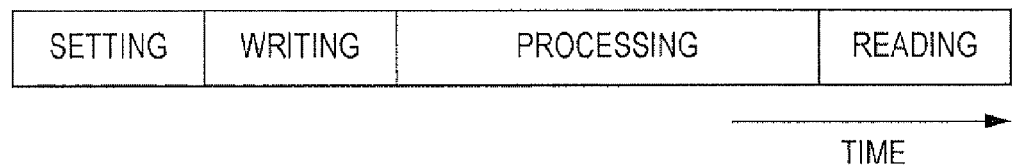
FIGS. 4A and 4B illustrate the operation of a dynamically reconfigurable processor (DRP)
Figure 4B:
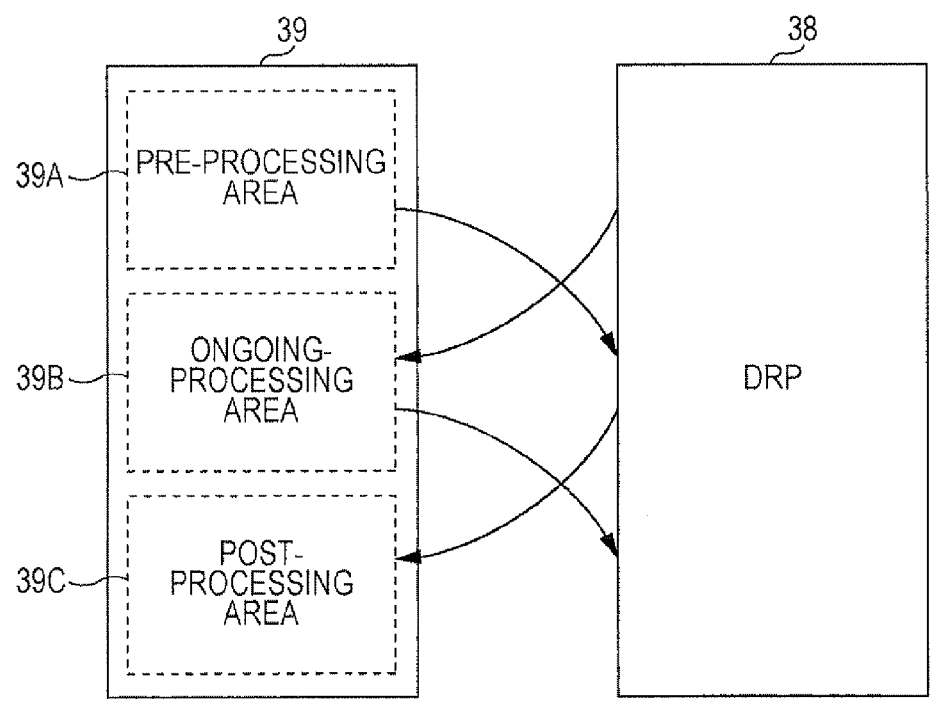

Next, an overview of the operation of each of the DRPs 38 will be described. FIGS. 4A and 4B illustrate the operation of each of the DRPs 38.

As illustrated in FIG. 4A, first, the DRP 38 performs setting in accordance with the content of image processing in response to a received instruction. This setting is performed by changing the internal data path. Subsequently, the DRP 38 accepts the writing of printing information or the like that is information to be processed, and then performs image processing on the printing information in accordance with the setting to generate image information. Then, the DRP 38 accepts the reading of the generated image information. The DRP 38 repeatedly performs the above processes.

As illustrated in FIG. 4B, each of the DRPs 38 has a storage unit 39. The storage unit 39 may be a semiconductor storage element such as a RAM, and includes a pre-processing area 39A that stores printing information, an ongoing-processing area 39B that stores intermediate information to be temporarily stored during the image processing of the DRP 38, and a post-processing area 39C that stores image information obtained as a result of image processing.

Here, a consideration will be given of a case where the DRP 38 is caused to successively execute processing. In a case where the DRP 38 is caused to successively execute processing, simply, the DRP 38 is caused to perform the operations in a manner illustrated in FIG. 5A.

The DRP 38 is capable of performing setting of image processing, writing printing information, and reading image information while executing image processing. Thus, the DRP 38 is caused to perform the operations in a manner illustrated in FIG. 5B, thus enabling the DRP 38 to efficiently perform image processing.

However, if the DRP 38 performs setting of the next image processing or writes printing information while reading and processing the information stored in the pre-processing area 39A of the storage unit 39, the printing information being processed may become damaged. In addition, if the DRP 38 writes the subsequent image information to the post-processing area 39C while the image processing controller 134 is reading image information from the post-processing area 39C of the storage unit 39, the image information being read by the image processing controller 134 may become damaged.

In order to prevent damage of printing information or image information, in a first exemplary embodiment, each of the storage units 39 is divided into two parts and is utilized.

Figure 6B:
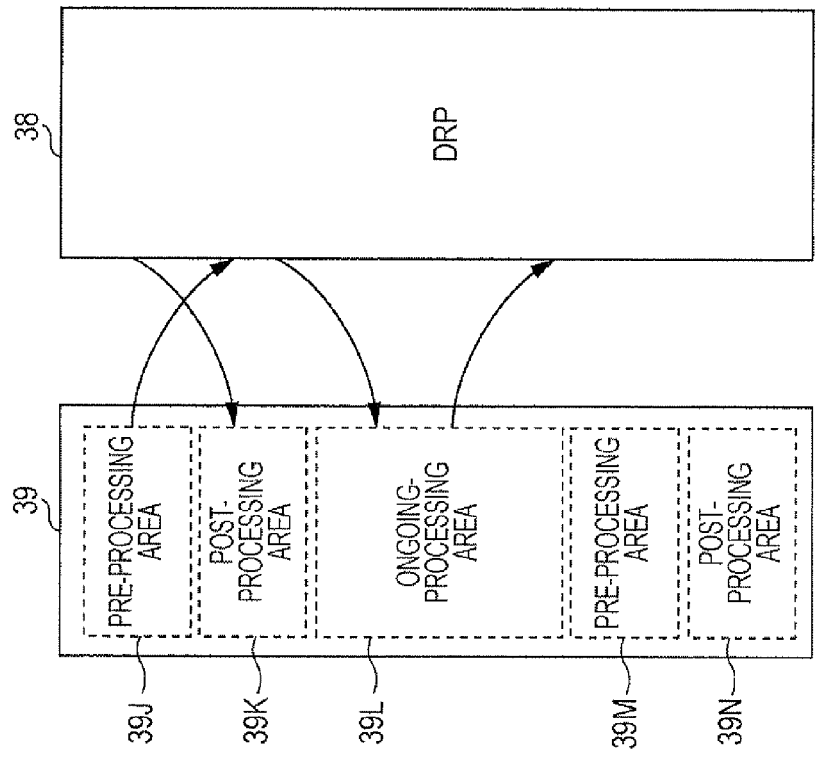
FIGS. 6A and 6B illustrate an example of how to use a storage unit.
Figure 6A:
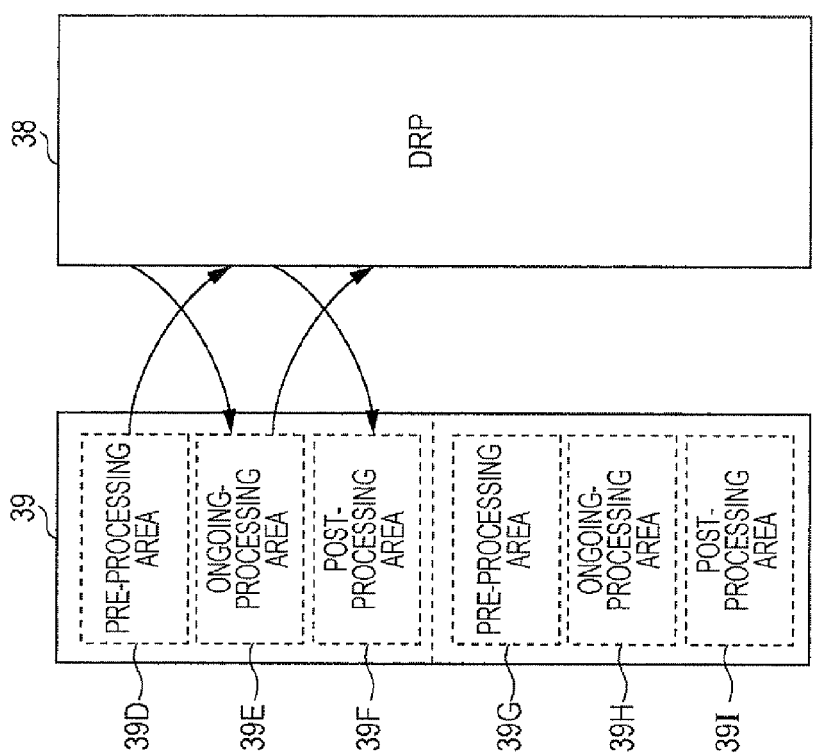

FIGS. 6A and 6B illustrate an example of how to use each of the storage units 39. As illustrated in FIG. 6A, the storage unit 39 includes a pre-processing area 39D that stores printing information, an ongoing-processing area 39E that stores intermediate information, a post-processing area 39F that stores image information, a pre-processing area 39G that stores printing information, an ongoing-processing area 39H that stores intermediate information, and a post-processing area 39I that stores image information obtained as a result of image processing. For convenience of description, the pre-processing area 39D, the ongoing-processing area 39E, and the post-processing area 39F are hereinafter referred to as up side (U-side) areas, and the pre-processing area 39G, the ongoing-processing area 39H, and the post-processing area 39I are referred to as down side (D-side) areas.

In this manner, each of the storage units 39 is divided into the U-side areas and the D-side areas, and the U-side areas and the D-side areas are alternately used. Therefore, damage of printing information or image information may be prevented.

Since an ongoing-processing area is used only by the DRP 38 to read and write intermediate information, intermediate information will not become damaged even if two separate ongoing-processing areas are not provided. Therefore, as illustrated in FIG. 6B, the storage unit 39 may include a pre-processing area 39J that stores printing information, a post-processing area 39K that stores image information, an ongoing-processing area 39L that stores intermediate information, a pre-processing area 39M that stores printing information, and a post-processing area 39N that stores image information.

Figure 7:
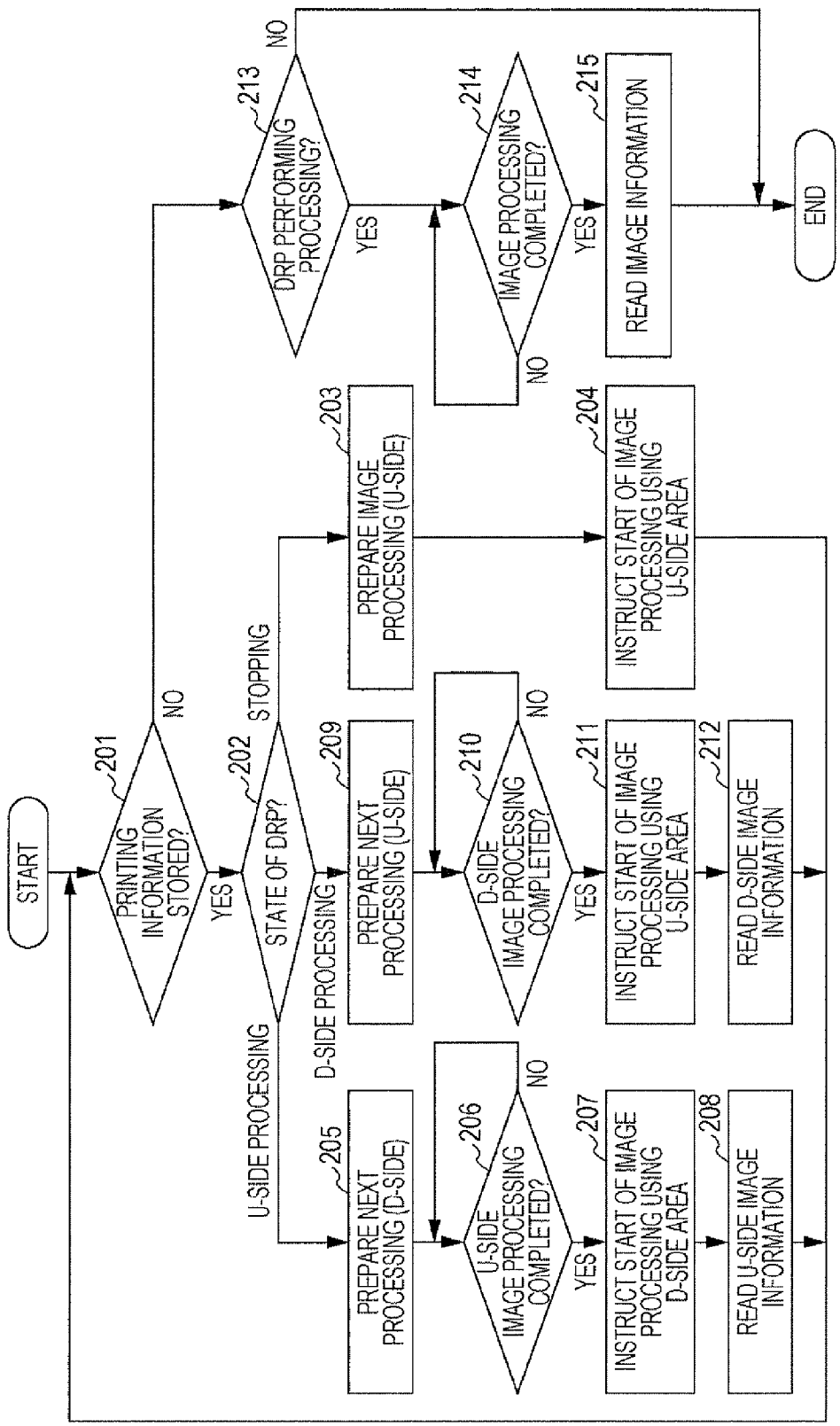
FIG. 7 is a flowchart illustrating an operation flow of an image processing controller.

Subsequently, a description will be made of the operation of the image processing controller 134 in a case where each of the storage units 39 is divided into U-side areas and D-side areas. FIG. 7 is a flowchart illustrating an operation flow of the image processing controller 134.

The image processing controller 134 starts a process of controlling each of the DRPs 38. If printing information to be processed is stored in the saving unit 132 (YES in step 201), the image processing controller 134 checks the state of the DRP 38. If the DRP 38 is stopping ("Stopping" in step 202) as a result of the check, the image processing controller 134 makes preparations for image processing using the pre-processing area 39D as a U-side area of the storage unit 39, that is, writes the setting for the DRP 38 and printing information to the pre-processing area 39D (step 203), and then instructs the DRP 38 to start image processing using a U-side area of the storage unit 39 (step 204). Then, the process returns to step 201.

If the printing information to be processed is stored in the saving unit 132 (YES in step 201) and the DRP 38 is performing image processing using a U-side area of the storage unit 39 ("U-side processing" in step 202), the image processing controller 134 makes preparations for image processing to be executed next by the DRP 38, using the pre-processing area 39G as a D-side area of the storage unit 39, that is, writes the setting for the DRP 38 and printing information to the pre-processing area 39G (step 205), and waits for the image processing using the U-side area of the storage unit 39 to be completed (NO in step 206). When the image processing using the U-side area of the storage unit 39 is completed (YES in step 206), the image processing controller 134 instructs the DRP 38 to start image processing using a D-side area of the storage unit 39 (step 207), and reads image information obtained as a result of the image processing using the U-side area from the post-processing area 39F (step 208). When the reading of the image information is completed, the process returns to step 201.

If the printing information to be processed is stored in the saving unit 132 (YES in step 201) and the DRP 38 is performing image processing using a D-side area of the storage unit 39 ("D-side processing" in step 202), the image processing controller 134 makes preparations for image processing to be executed next by the DRP 38, using the pre-processing area 39D as a U-side area of the storage unit 39, that is, writes the setting for the DRP 38 and printing information to the pre-processing area 39D (step 209), and waits for the image processing using the D-side area of the storage unit 39 to be completed (NO in step 210). When the image processing using the D-side area of the storage unit 39 is completed (YES in step 210), the image processing controller 134 instructs the DRP 38 to start image processing using a U-side area of the storage unit 39 (step 211), and reads image information obtained as a result of the image processing using the D-side area from the post-processing area 39I (step 212). When the reading of the image information is completed, the process returns to step 201.

If the printing information to be processed is not stored in the saving unit 132 (NO in step 201), when the DRP 38 is performing image processing using a U-side or D-side area of the storage unit 39 (YES in step 213), the image processing controller 134 waits for the image processing to be completed (NO in step 214). When the image processing is completed (YES in step 214), the image processing controller 134 reads image information obtained as a result of the image processing using the U-side or D-side area from the post-processing area 39F or 39I (step 215). Then, the process of controlling the DRP 38 ends.

If the printing information to be processed is not stored in the saving unit 132 (NO in step 201), when the DRP 38 is stopping (NO in step 213), the image processing controller 134 ends the process of controlling the DRP 38.

Second Exemplary Embodiment

In the first exemplary embodiment, an example has been described in which each of the storage units 39 is divided into U-side areas and D-side areas, and the U-side areas and the D-side areas are alternately used to prevent damage of printing information or image information. In a second exemplary embodiment, in contrast, an example will be described in which, as illustrated in FIG. 4B, each of the storage units 39 includes a pre-processing area 39A that stores printing information, an ongoing-processing area 39B that stores intermediate information, and a post-processing area 39C that stores image information, and the writing of printing information to the pre-processing area 39A by the image processing controller 134 and the writing of image information to the post-processing area 39C by the DRP 38 are controlled to prevent damage of printing information or image information.

The image processing controller 134 according to the second exemplary embodiment performs a process of writing printing information to the pre-processing area 39A on the basis of the condition that the image processing controller 134 has been notified of the freeing of the pre-processing area 39A by using an interrupt from the DRP 38.

The DRP 38 notifies the image processing controller 134 of freeing of the pre-processing area 39A by using an interrupt when it is no longer necessary to refer to the printing information stored in the pre-processing area 39A during image processing. After confirming that the image information stored in the post-processing area 39C has been read by the image processing controller 134, the DRP 38 performs a process of writing the image information generated through image processing to the post-processing area 39C.

Figure 8:
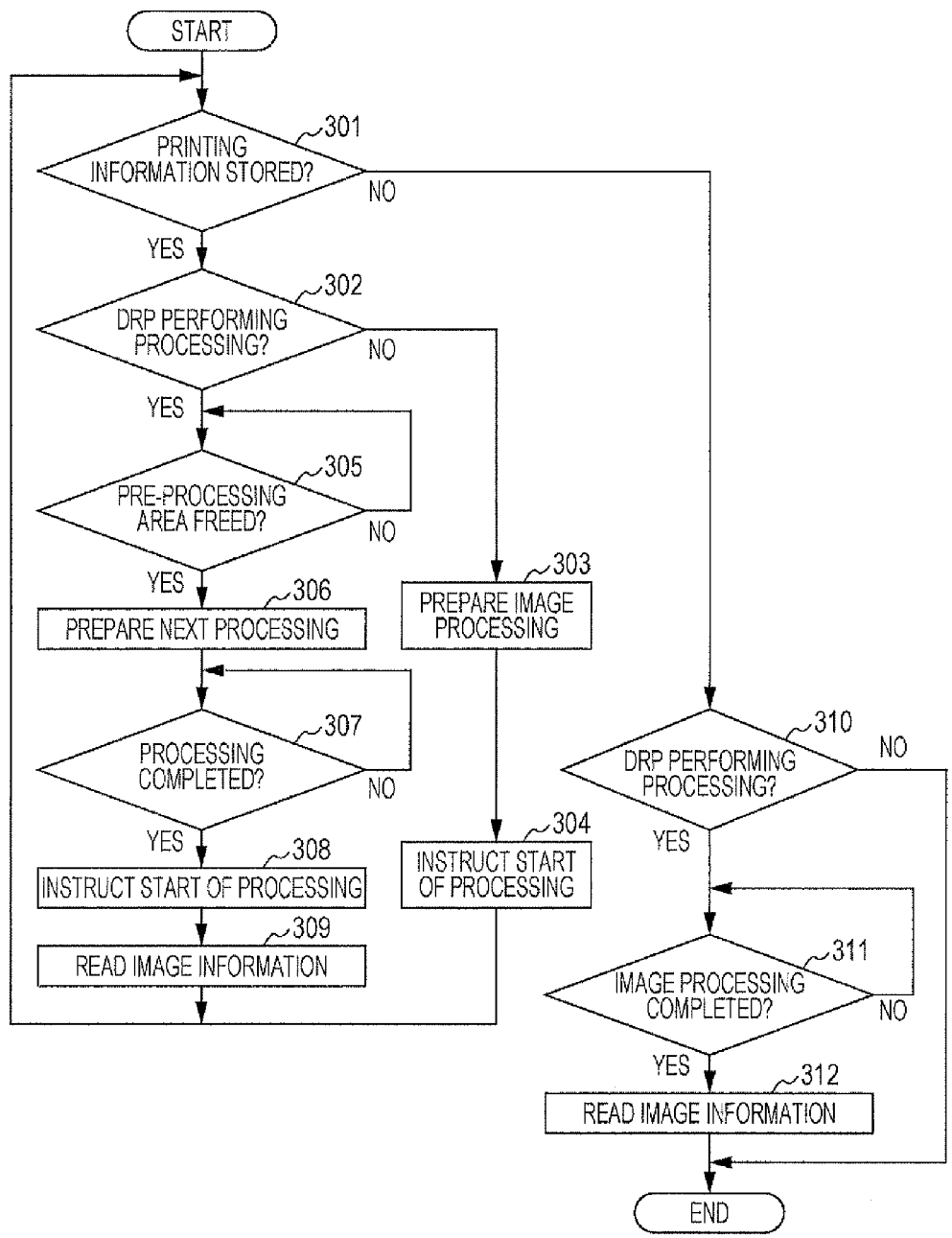
FIG. 8 is a flowchart illustrating an operation flow of the image processing controller.

Next, a description will be made of the operation of the image processing controller 134. FIG. 8 is a flowchart illustrating an operation flow of the image processing controller 134.

The image processing controller 134 starts a process of controlling each of the DRPs 38. If printing information to be processed is stored in the saving unit 132 (YES in step 301), the image processing controller 134 checks the state of the DRP 38. If the DRP 38 is stopping (NO in step 302) as a result of the check, the image processing controller 134 makes preparations for image processing, that is, writes the setting for the DRP 38 and printing information to the pre-processing area 39A (step 303), and then instructs the DRP 38 to start image processing (step 304). Then, the process returns to step 301.

If the printing information to be processed is stored in the saving unit 132 (YES in step 301) and, as a result of checking the state of the DRP 38, the DRP 38 is performing image processing (YES in step 302), the image processing controller 134 waits for a notification of the pre-processing area 39A having been freed to be sent from the DRP 38 (NO in step 305). When a notification of the pre-processing area 39A having been freed is sent from the DRP 38 (YES in step 305), the image processing controller 134 makes preparations for image processing to be executed next by the DRP 38, that is, writes the setting for the DRP 38 and printing information to the pre-processing area 39A (step 306), and waits for the image processing of the DRP 38 to be completed (NO in step 307).

When the image processing of the DRP 38 is completed (YES in step 307), the image processing controller 134 instructs the DRP 38 to start the next image processing (step 308), and reads image information obtained as a result of the image processing from the post-processing area 39C (step 309). When the reading of the image information is completed, the process returns to step 301.

If the printing information to be processed is not stored in the saving unit 132 (NO in step 301), when the DRP 38 is performing image processing (YES in step 310), the image processing controller 134 waits for the image processing to be completed (NO in step 311). When the image processing is completed (YES in step 311), the image processing controller 134 reads image information obtained as a result of the image processing from the post-processing area 39C (step 312). Then, the process of controlling the DRP 38 ends.

If the printing information to be processed is not stored in the saving unit 132 (NO in step 301), when the DRP 38 is stopping (NO in step 310), the image processing controller 134 ends the process of controlling the DRP 38.

Figure 9:
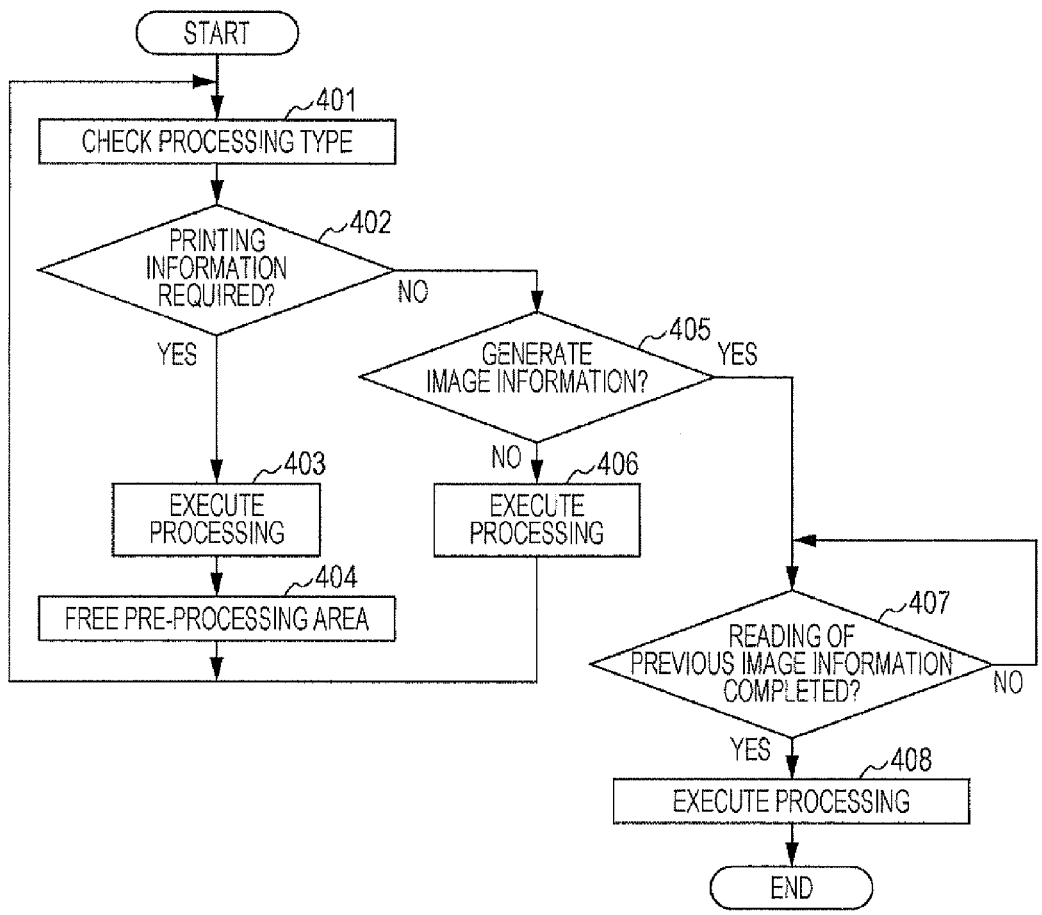
FIG. 9 is a flowchart illustrating an operation flow of the DRP.

Subsequently, a description will be made of the operation of each of the DRPs 38. FIG. 9 is a flowchart illustrating an operation flow of each of the DRPs 38.

Upon receipt of an instruction for starting image processing from the image processing controller 134 via the DRP controller 135, first, the DRP 38 checks the type of processing to be executed next (step 401). Processing types include processing of referring to printing information and generating intermediate information, processing of referring to intermediate information and generating different intermediate information, and processing of referring to intermediate information and generating image information.

If the checked processing type indicates the processing of referring to printing information and generating intermediate information (YES in step 402), the DRP 38 executes the corresponding processing (step 403). When the processing is completed, the DRP 38 notifies the image processing controller 134 of freeing of the pre-processing area 39A by using an interrupt (step 404). Then, the process returns to step 401.

If, as a result of checking the processing type, the type of processing to be executed next indicates the processing of referring to intermediate information and generating different intermediate information (NO in step 402 and NO in step 405), the DRP 38 executes the corresponding processing (step 406). When the processing is completed, the process returns to step 401.

If, as a result of checking the processing type, the type of processing to be executed next indicates the processing of referring to intermediate information and generating image information (NO in step 402 and YES in step 405), the DRP 38 checks whether or not the image information generated through the immediately preceding image processing has been read by the image processing controller 134. If the reading has not been completed, the DRP 38 waits for the reading to be completed (NO in step 407). When the reading is completed or if the reading has already been completed (YES in step 407), the DRP 38 executes the corresponding processing (step 408). When the processing is completed, the image processing ends.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a dynamically reconfigurable processor that dynamically changes a configuration thereof and that is configured to make internal data paths dynamically changeable to perform image processing in accordance with the changed configuration;
a memory that stores setting information for setting a change of the configuration of the dynamically reconfigurable processor, printing information used for image processing to be performed by the dynamically reconfigurable processor, and image information generated through image processing performed by the dynamically reconfigurable processor the memory including a pre-processing information memory area storing the setting information and the printing information and post-processing information memory area storing the image information;
a setting information writing unit that writes the setting information to the memory;
a printing information writing unit that writes the printing information to the memory;
an image information reading unit that reads the image information from the memory; and
an instruction unit that instructs the dynamically reconfigurable processor to start execution of image processing, wherein
in a case where the dynamically reconfigurable processor is caused to successively execute first image processing and second image processing,
the setting information writing unit writes setting information corresponding to the second image processing in parallel with the first image processing,
the printing information writing unit writes printing information to be used for the second image processing to the processing information memory area in parallel with the first image processing while the dynamically reconfigurable processor is executing the first image processing,
the instruction unit instructs that execution of the second image processing be started after the dynamically reconfigurable processor completes the first image processing,
the image information reading unit reads image information corresponding to the first image processing from the post-processing information memory area in parallel with second image processing while the dynamically reconfigurable processor is executing the second image processing, and
the first image processing does not execute in parallel with the second image processing.

2. The image processing apparatus according to claim 1, wherein
the pre-processing information memory area is divided into a first pre-processing information memory area corresponding to the first image processing, and a second pre-processing information memory area corresponding to the second image processing, and
the post-processing information memory area is divided into a first post-processing information memory area corresponding to the first image processing, and a second post-processing information memory area corresponding to the second image processing.

3. The image processing apparatus according to claim 1, wherein
the setting information writing unit and the printing information writing unit write setting information corresponding to the second image processing and printing information corresponding to the second image processing, respectively, to the pre-processing information memory area on the basis of a condition that it has been notified by the dynamically reconfigurable processor that a reference to the pre-processing information memory area has been completed while the dynamically reconfigurable processor is executing the first image processing, and the dynamically reconfigurable processor identifies that the image information reading unit has completed reading the image information corresponding to the first image processing while the dynamically reconfigurable processor is executing the second image processing, and, after the identification, causes image information generated through the second image processing to be stored in the post-processing information memory area.

4. A non-transitory computer readable medium storing a program causing a computer to execute a process for performing image processing control, the process comprising:
writing, to a memory included in a dynamically reconfigurable processor that dynamically changes a configuration thereof and that is configured to make internal data paths dynamically changeable to perform image processing in accordance with the changed configuration, setting information for setting a change of the configuration of the dynamically reconfigurable processor,
the memory storing the setting information, printing information used for image processing to be performed by the dynamically reconfigurable processor, and image information generated through image processing performed by the dynamically reconfigurable processor, the memory including a pre-processing information memory area storing the setting information and the printing information and a post processing information memory area storing the image information;
writing the printing information to the memory;
reading the image information from the memory; and
instructing the dynamically reconfigurable processor to start execution of image processing, wherein
in a case where the dynamically reconfigurable processor is caused to successively execute first image processing and second image processing,
the writing of the setting information writes setting information corresponding to the second image processing in parallel with the first image processing,
the writing of the printing information writes printing information to be used for the second image to the processing information memory area in parallel with the first image processing while the dynamically reconfigurable processor is executing the first image processing,
the instructing instructs that execution of the second image processing be started after the dynamically reconfigurable processor completes the first image processing, and
the reading reads image information corresponding to the first image processing from the post-processing information memory area in parallel with the second image processor while the dynamically reconfigurable processor is executing the second image processing, and
the first image processing does not execute in parallel with the second image processing.

5. The non-transitory computer readable medium according to claim 4, wherein
the pre-processing information memory area is divided into a first pre-processing information memory area corresponding to the first image processing, and a second pre-processing information memory area corresponding to the second image processing,
the post-processing information memory area is divided into a first post-processing information memory area corresponding to the first image processing, and a second post-processing information memory area corresponding to the second image processing, the writing of the setting information writes setting information corresponding to the first image processing to the first pre-processing information memory area, and writes the setting information corresponding to the second image processing to the second pre-processing information memory area, the writing of the printing information writes printing information corresponding to the first image processing to the first pre-processing information memory area, and writes the printing information corresponding to the second image processing to the second pre-processing information memory area, and the reading of the image information reads the image information corresponding to the first image processing from the first post-processing information memory area, and reads image information corresponding to the second image processing from the second post-processing information memory area.

6. The non-transitory computer readable medium according to claim 4, wherein the writing of the setting information and the writing of the printing information write setting information corresponding to the second image processing and printing information corresponding to the second image processing, respectively, to the pre-processing information memory area on the basis of a condition that it has been notified by the dynamically reconfigurable processor that a reference to the pre-processing information memory area has been completed while the dynamically reconfigurable processor is executing the first image processing.

* * * * *